United States Patent
Yamanoi et al.

(10) Patent No.: US 7,126,889 B2
(45) Date of Patent: Oct. 24, 2006

(54) TRACKING ERROR DETECTOR

(75) Inventors: Koyu Yamanoi, Chiba-ken (JP);
Hironobu Murata, Yokohama (JP);
Aoe Takashi, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 63 days.

(21) Appl. No.: 10/314,821

(22) Filed: Dec. 9, 2002

(65) Prior Publication Data
US 2004/0047250 A1    Mar. 11, 2004

(30) Foreign Application Priority Data
Dec. 27, 2001   (JP)  .............................. 2001-395902

(51) Int. Cl.
*G11B 7/00* (2006.01)
(52) U.S. Cl. ............... 369/44.28; 369/44.34; 369/44.41
(58) Field of Classification Search ............ 369/44.27, 369/44.28, 44.29, 44.34, 44.41, 44.42, 44.35, 369/44.26
See application file for complete search history.

(56) References Cited

U.S. PATENT DOCUMENTS

| | | | | |
|---|---|---|---|---|
| 4,744,069 A | * | 5/1988 | Sugiyama et al. | ....... 369/44.29 |
| 5,854,781 A | * | 12/1998 | Kurihara | ................... 369/53.29 |
| 6,646,961 B1 | * | 11/2003 | Iida et al. | ................ 369/44.26 |

FOREIGN PATENT DOCUMENTS

JP        61-242347    * 10/1986   .............. 369/44.28

* cited by examiner

*Primary Examiner*—Nabil Hindi
(74) *Attorney, Agent, or Firm*—Carlton H. Hoel; W. James Brady; Frederick J. Telecky, Jr.

(57) ABSTRACT

A circuit to improve the SN characteristic of a tracking error signal. This tracking error detection circuit is formed as a push-pull system utilizing a quadrant type photo-detector and provided with 4 gain control amplifiers 20, 22, 24, and 26, 4 bottom envelope circuits 28, 30, 32, and 34, a pair of subtracting circuits 36 and 38, adding (subtracting) circuit 40, offset circuit 42, and gain control circuit 44. Bottom envelope circuits 28, 30, 32, and 34 are configured with a capacitor-type peak-hold circuit, for example, whereby bottom envelopes of RF signals SA, SB, SC, and SD given from light receiving areas A, B, C, and D of a photo-detector via gain control amplifiers 20, 22, 24, and 26 are detected, and bottom envelope signals SAbtm, SBbtm, SCbtm, and SDbtm representing the waveforms of the respective bottom envelopes are output.

4 Claims, 9 Drawing Sheets

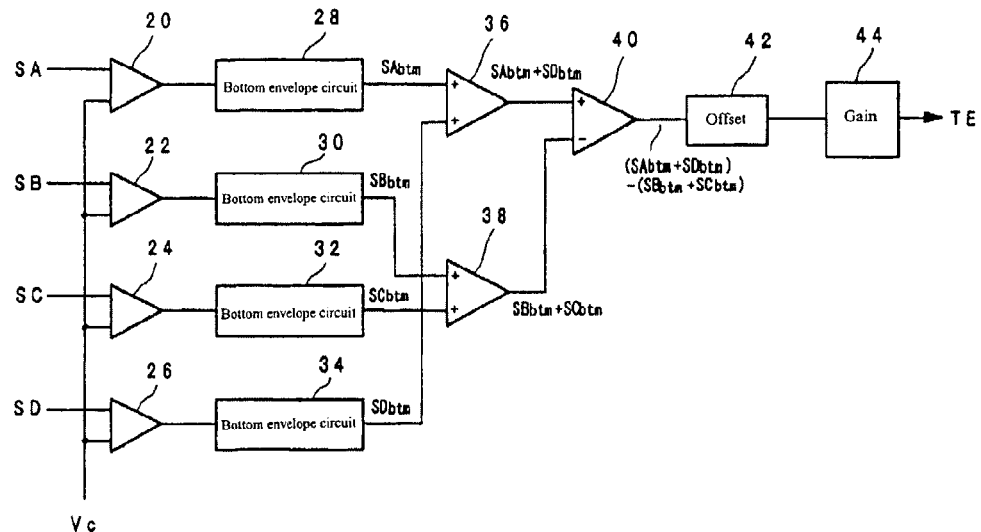
FIG. 1
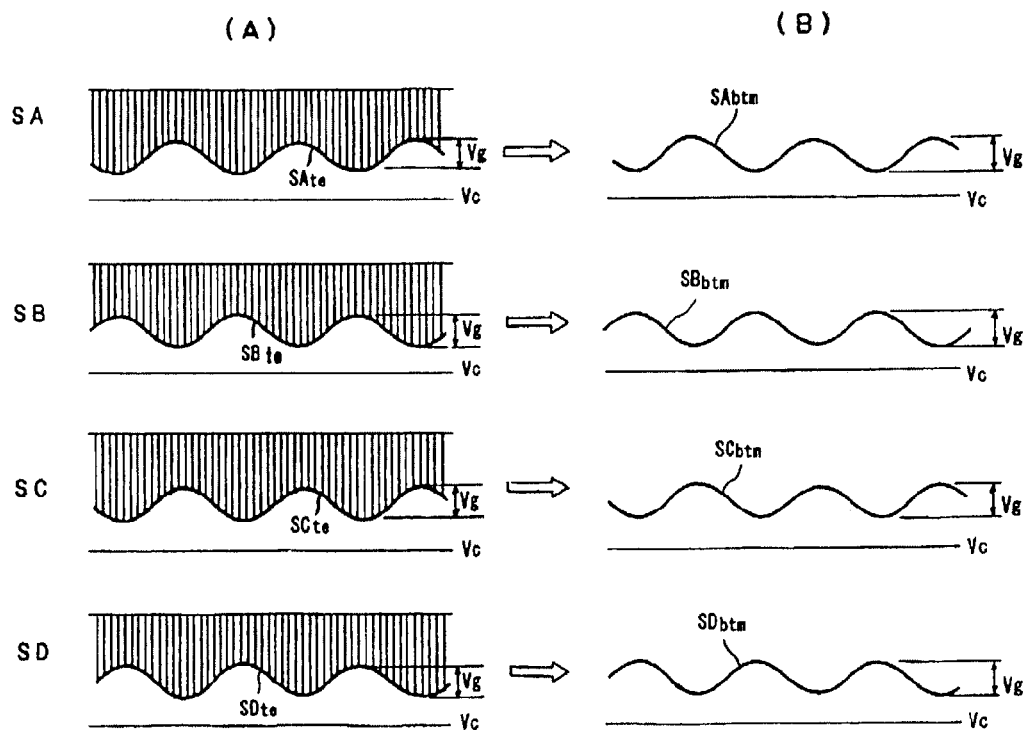
FIG. 2 (A), (B)

(A)
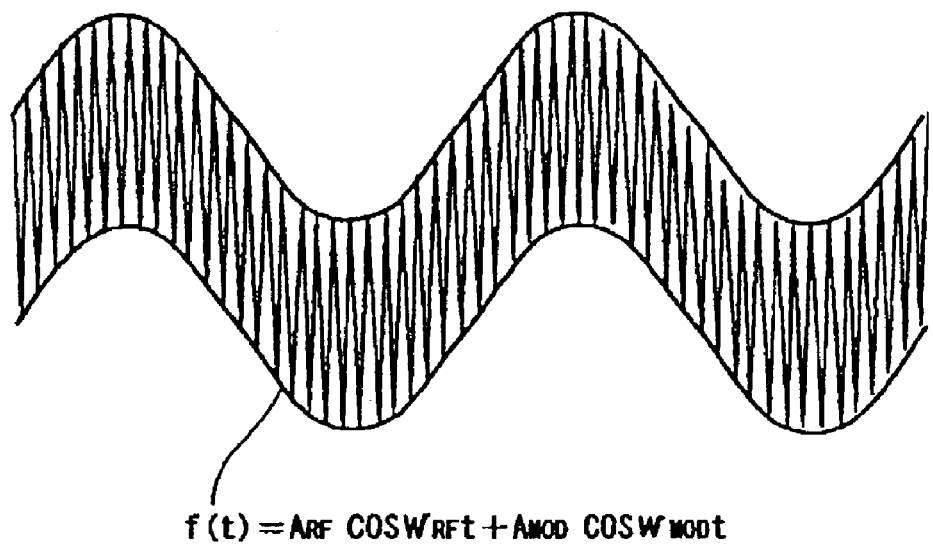
$f(t) = A_{RF} \cos W_{RF} t + A_{MOD} \cos W_{MOD} t$
(B)
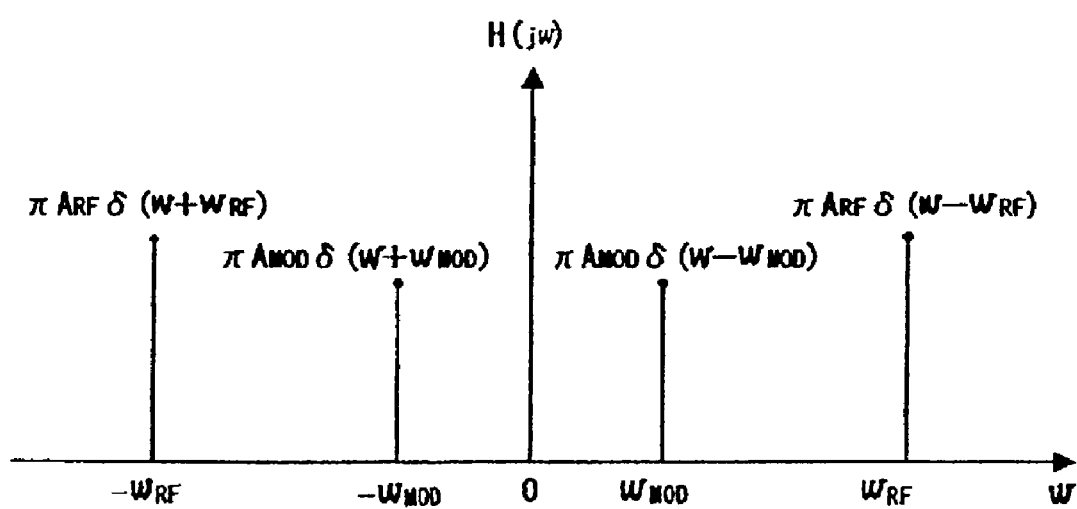
FIG. 9

(A)
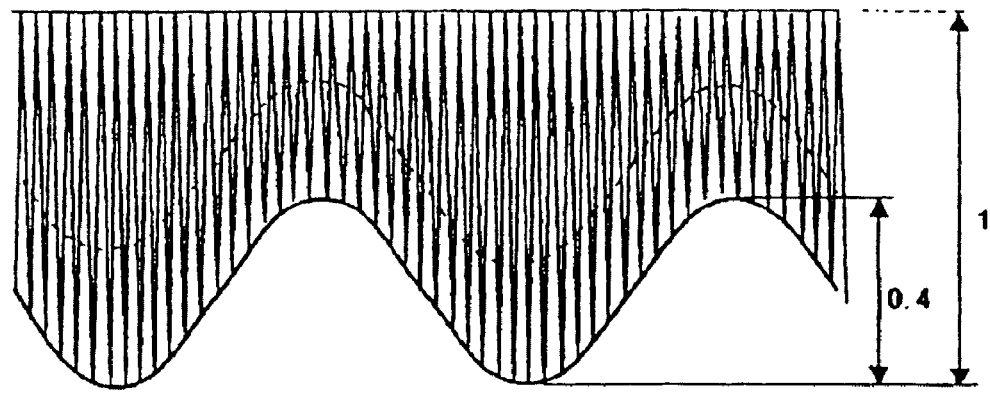
f(t) = A_RF COSW_RFt × (1−A_MOD COSW_MODt) + A_RF−A_MOD COSW_MODt
(B)
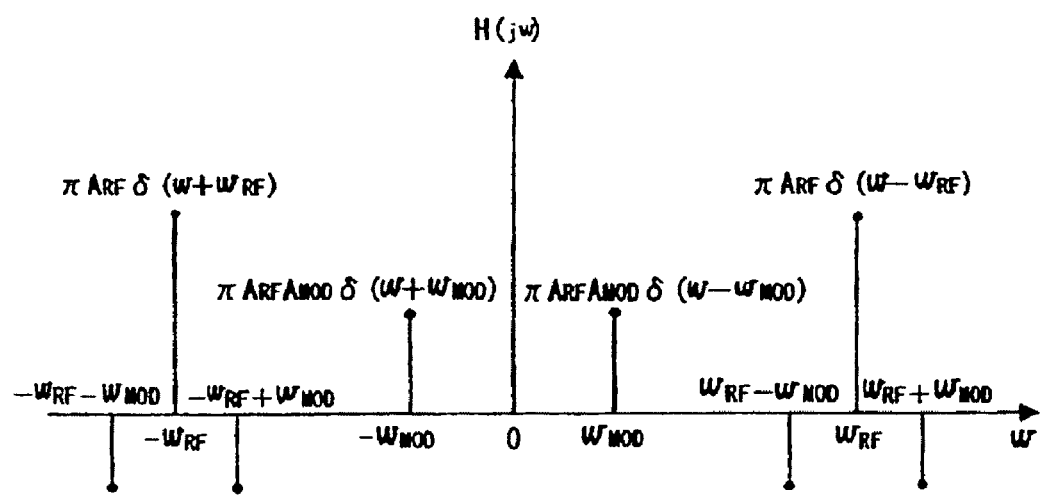
FIG. 10

TRACKING ERROR DETECTOR

FIELD OF THE INVENTION

The present invention pertains to a tracking error detector for detecting a tracking error in an optical disk device.

BACKGROUND OF THE INVENTION

FIG. 11 shows basic workings of the optical disk device.

Optical disk 10 is a donut-shaped disk (disc) having a hole at the center, and tracks are created using trains of pits arranged concentrically on its signal recording plane (lower plane in FIG. 11) 10a. During playback, spindle motor 12 rotates optical disk 10 at a prescribed linear velocity by means of a CLV (Constant Linear Velocity) method, for example.

Movable optical pickup 14 is provided opposite signal recording plane 10a of optical disk 10 in the radial direction. Optical pickup 14 focuses and irradiates laser beam LB onto signal recording plane 10a of optical disk 10, detects a reflected beam of light from signal recording plane 10a, applies photoelectric conversion to it, and generates an electric signal having a waveform corresponding to the bumps of the pit trains. The electric signal output from optical pickup 14 is supplied to RF amplifier 16, and a regenerative data signal, a tracking error signal, and a focus error signal are generated by said RF amplifier 16. Regenerative data signal SM output from RF amplifier 16 is input to a signal processing part (not illustrated) and receives necessary signal processing, such as decoding and error correction. Tracking error signal TE and focus error signal FE output from RF amplifier 16 are sent to pickup servo 18. The pickup servo 18 performs tracking control for positioning regarding beam spot SP of laser beam LB on a track (pit train) or for following it and focusing control for focusing beam spot SP on the pits appropriately.

An example photo-detector serving as a photoelectric conversion part built into optical pickup 14 is shown in FIG. 12. The photo-detector is of a quadrant type for a push-pull system, wherein, for example, 4 photo-conversion parts configured with photodiodes or light receiving areas A, B, C, and D are arranged while separated from one another by assembling them from 4 diagonal directions. Beam LB' of the returned light or reflected light from signal recording plane 10a of optical disk 10 is focused and incident to the light receiving areas (A, B, C, and D) of the photo-detector through a detection optical system, such as an optical lens, and electric signals (will be referred to as RF signals, hereinafter) SA, SB, SC, and SD are generated according to the respective quantities of light or the intensities of light received by respective light receiving areas A, B, C, and D. Furthermore, these RF signals are voltage signals applied with I–V conversion within pickup 14, and they use the level of reference voltage Vc given as a bias voltage to the pickup from the outside as a reference. Waveforms of RF signals SA, SB, SC, and SD are shown schematically in FIG. 13.

In said photo-detector, RF signals SA and SD obtained from light receiving areas A and D located on the left side of the center line in parallel with the direction of the track are of the same phase, RF signals SB and SC obtained from light receiving areas B and C located on the right side are also of the same phase, and RF signals SA and SD and RF signals SB and SC are of opposite phase.

When beam spot SP of laser beam LB is positioned at the center of the track (when on-track) on signal recording plane 10a of optical disk 10, reflected beam LB' from signal recording plane 10a is incident onto the center parts of the light receiving areas (A, B, C, and D) of the photo-detector, and the levels of RF signals SA and SD obtained from light receiving areas A and D on the left and the levels of RF signals SB and SC obtained from light receiving areas B and C on the right become approximately the same.

However, as beam spot SP deviates from the center of the track in the radial direction, reflected beam LB' is incident onto positions deviated either to the left or the right from the center parts of the light receiving areas (A, B, C, and D) of the photo-detector, so that the levels of RF signals SA and SD on the side of light receiving areas A and D on the left and the levels of RF signals SB and SC on the side of light receiving areas B and C on the right become different. For example, when beam spot SP deviates inward along the radial direction, the focus position of reflected beam LB' is offset further toward the left side of the light receiving areas (A, B, C, and D), and the levels of RF signals SA and SD on the side of light receiving areas A and D on the left become higher than when they are on-track, while the levels of RF signals SB and SC on the side of light receiving areas B and C on the right become lower than when they are on-track. In contrast, when beam spot SP deviates outward in the radial direction, the focus position of reflected beam LB' offsets further toward the right side of the light receiving areas (A, B, C, and D), and the levels of RF signals SB and SC on the side of light receiving areas B and C on the right become higher than when they are on-track, while the levels of RF signals SA and SD on the side of light receiving areas A and D on the left become lower than when they are on-track.

The basic configuration of a conventional tracking error detection circuit of a push-pull system is shown in FIG. 14. Said tracking error detection circuit has a pair of adding circuits 100 and 102, a subtracting circuit 104, and low-pass filter 106. Adding circuit 100 on one side takes the sum (SA+SD) of RF signals SA and SD from light receiving areas A and D on the left side of the photo-detector (FIG. 12), and the other adding circuit 102 takes the sum (SB+SC) of RF signals SB and SC from light receiving areas B and C on the right. Subtracting circuit 104 takes the difference {(SA+SD)–(SB+SC)} between the added signals. Low-pass filter 106 removes high-frequency elements, that is, RF signal elements, from the difference signal output from subtracting circuit 104 and outputs tracking error signal TE.

In the case of an optical disk device, the accuracy of the tracking error signal determines the precision of the tracking servo. Typically, when the optical pickup is to undergo jumping from the track currently being tracked to another track, if the tracking error signal is not accurate, a long time is required from when the tracking servo is activated near the target track until it becomes on-track, or on-track becomes difficult to achieve.

Waveforms of RF signals SA, SB, SC, and SD obtained from light receiving areas A, B, C, and D of the photo-detector (FIG. 12) during a track jump are shown schematically in FIG. 15. Sine-wave-like level change Ste appears at the bottom of the waveform of each RF signal because beam spot SP of laser beam LB irradiated from optical pickup 14 to signal recording plane 10a crosses a track part and an inter-track mirror part (flat part where no pits are present) alternately in the radial direction at a fixed speed. That is, when beam spot SP crosses the track part, intensity modulation or diffraction is maximized by pits (light intensity of the reflected beam is thus minimized), and the intensity modulation is minimized (light intensity of the reflected beam is thus maximized) when beam spot SP crosses the mirror part. Normally, a portion of beam spot SP overlays on adjoining tracks even when it is at the center of the mirror part, and the overlaid parts are subject to intensity modulation. Thus, the maximum point of the bottom level of an RF signal never becomes as high as the top level, and the high-frequency modulated element also remains near the maximum point.

In the case of the conventional tracking error detection circuit (FIG. 14), tracking error TE representing the positional error of beam spot SP in the radial direction can be obtained by applying prescribed operations (push-pull operations) using operation circuits (100, 102, and 104) to RF signals SA, SB, SC, and SD obtained from respective light receiving areas A, B, C, and D of the photo-detector. However, during low-speed playback, the frequencies of the RF signals and the frequency of the tracking signal elements are close to each other, so that it is difficult to separate the signals using the low-pass filter, resulting in a problem that RF signal elements RFn are likely to remain in tracking signal TE as shown in FIG. 16. On the other hand, during high-speed playback, although the signals can be separated using the low-pass filter because the frequencies of the RF signals and the frequency of the tracking signal element are not close to each other, there is a problem that the SN characteristic becomes deteriorated since tracking signal TE becomes attenuated drastically (approximately ½) by the low-pass filter as shown in FIG. 17.

In the case of a general optical disk, such as a CD (Compact Disc) and a DVD (Digital Versatile Disk), EFM (Eight to Fourteen Modulation) is utilized as a method for modulating data to be recorded on the tracks, and the lengths of pits are restricted to fall within the range of 3T–11T (T represents one bit length) so as to satisfy the 2, 10 RLL (Run-length Limited) code requirement, that is, the length of "0" continues 2 times or more but not more than 11 times. Therefore, although the channel clock frequency is 4.32 MHz when a CD is played back at 1× speed, the frequencies of the RF signals become maximum, that is, 720 kHz, at the location 3T/3T, and they fall down to 196 kHz or so at the location 11T/11T. It is desirable that such RF signal elements in the tracking error signal by small enough to be ignored in order to achieve tracking servo accurately.

However, in the case of the conventional tracking error detection circuit, it is usually difficult to separate or cut RF signal elements of 196 kHz or so relative to tracking error signal TE obtained from tracking modulation element Ste of 10 kHz even when they are put through low-pass filter 106.

In addition, during the conversion into a digital signal, the amplitude of tracking error signal TE is increased using operation circuits (100, 102, and 104) or a special gain control amplifier (not illustrated) in order to match the input range of an AD converter (not illustrated) of the latter stage. However, because the RF signal elements are also amplified, the gain cannot be increased sufficiently. In addition, because the RF signal elements are mixed, the digital signal is not very precise.

On the other hand, during a playback of a CD at 30× speed or a DVD at 6× speed or faster, bands for the RF signals reach 10 MHz or higher. Thus, when the bands for the operation circuits 100, 102, and 104 are only several MHz or so, those operation circuits function as low-pass filters. Thus, not only are the RF signal elements attenuated, but tracking modulation element Ste from which tracking error signal TE is obtained is also attenuated to ½, that is, reduced to one half, and the SN drops by 6 dB as a result.

Although the example pertains to a push-pull system utilizing a quadrant type photo-detector, similar problems are also found for conventional tracking error detection circuits in other methods.

The present invention was developed in light of such conventional problems, and its objective is to present a tracking error detector by which a tracking error signal from which high-frequency elements are cut sufficiently can be obtained.

Another objective of the present invention is to present a tracking error detector by which a tracking error signal with an excellent SN ratio can be obtained.

Yet another objective of the present invention is to present a tracking error detector by which a tracking error signal which can be digitized easily can be obtained.

SUMMARY OF THE INVENTION

In order to achieve the goals, the first tracking error detector of the present invention is a tracking error detector for detecting a positional error in the radial direction perpendicular to the track direction of a beam spot on a recording plane of an optical disk as a tracking error, which is configured with a photo-detection means which receives a reflected light beam from the signal recording plane of the optical disk and outputs an electric signal according to the light intensity, a bottom envelope detection circuit which detects the bottom envelope of the electric signal and generates a bottom envelope signal representing the waveform of the bottom envelope, and a tracking error generating means which applies arithmetic processing to the bottom envelope signal in order to generate a tracking error signal representing the tracking error.

The second tracking error detector of the present invention is a tracking error detector for detecting a positional error in the radial direction perpendicular to the track direction of a beam spot on a recording plane of an optical disk as a tracking error, which is formed with a photo-detection circuit which receives a beam of light reflected by the signal recording plane of the optical disk using a first and a second light receiving area provided in inverse phase and outputs a first and a second electric signal according to the light intensities of the light beam at the respective light receiving areas, bottom envelope detection means which detect bottom envelopes of the first and second electric signals and generate a first and a second bottom envelope signal representing the waveforms of the respective bottom envelopes, and a tracking error generating circuit which takes the difference between the first bottom envelope signal and the second bottom envelope signal in order to generate a tracking error signal representing the tracking error.

The third tracking error detector of the present invention is a tracking error detector for detecting a positional error in the radial direction perpendicular to the track direction of a beam spot on a recording plane of an optical disk as a tracking error, which is formed with a photo-detection circuit which receives a beam of light reflected by the signal recording plane of the optical disk using a first and a second set of light receiving areas provided in inverse phase and outputs multiple electric signals according to the light intensities of the light beam reflected at the light receiving areas of the respective sets, bottom envelope detection circuit which detect bottom envelopes of the multiple electric signals and generate multiple bottom envelope signals representing the waveforms of the respective bottom envelopes, a first adding circuit which takes the sum of the multiple bottom envelope signals obtained from the first set of light receiving areas in order to generate a first added signal, a first adding circuit which takes the sum of the multiple bottom envelope signals obtained from the second set of light receiving areas in order to generate a second added signal, and a tracking error generating circuit which takes the difference between the first added signal and the second added signal in order to generate a tracking error signal representing the tracking error.

In the case of the tracking error detector of the present invention, the tracking modulation elements which appear at the bottom of the electric signals output from the photo-detection means are extracted as bottom envelopes, and prescribed arithmetic processing is applied to the bottom envelope signals in order to obtain a tracking error signal which hardly contains any or very little of the high-frequency elements of said electric signal, demonstrates an excellent SN characteristic, and is easy to digitize.

In the present invention, in order to compensate the offset caused by a skewed optical disk or a positional deviation of the optical system, it is desirable that the configuration include a top envelope detection circuit which detect top envelopes of the respective electric signals in order to generate top envelope signals representing the waveforms of said top envelopes and a correction circuit which subtracts the top envelope signals from the corresponding bottom envelope signals in order to correct the bottom envelope signals.

In the present invention, as a desirable embodiment for obtaining the electric signals for tracking control from the photo-detection circuit, the configuration may be such that one of the reflected light beams obtained from 1 beam spot position on the signal recording plane of the optical disk is incident onto the first or the first set of light receiving areas and the second or the second set of light receiving areas at a light intensity rate in accordance with the tracking error. Alternatively, as another desirable embodiment, the configuration may be such that a pair of reflected light beams obtained from a pair of positions determined near the recording plane of the optical disk in the radial direction at a fixed distance are incident to the first or the first set of light receiving areas and the second or the second set of light receiving areas individually at a light intensity rate in accordance with the tracking error.

BRIEF DESCRIPTION OF THE DRAWINGS

FIG. 1 represents a block diagram showing an example configuration of the tracking error detector in an embodiment of the present invention.

FIG. 2 represents waveforms showing the function of the tracking error detection circuit of the embodiment.

FIG. 9 represents a waveform and frequency spectra showing a model for explaining the method of the present invention schematically.

FIG. 10 represents a waveform and frequency spectra showing a model for explaining the conventional method schematically.

DESCRIPTION OF THE EMBODIMENTS

Desirable embodiments of the present invention will be explained below in reference to FIGS. 1 through 10.

Figure 12:
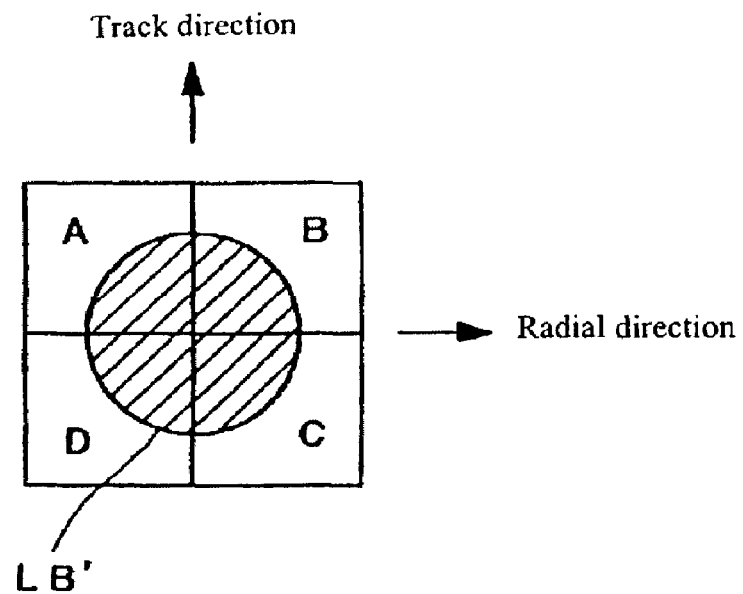
FIG. 12 represents an outlined plan diagram showing an example configuration of an optical disk device to which the present invention can be applied.
Figure 13:
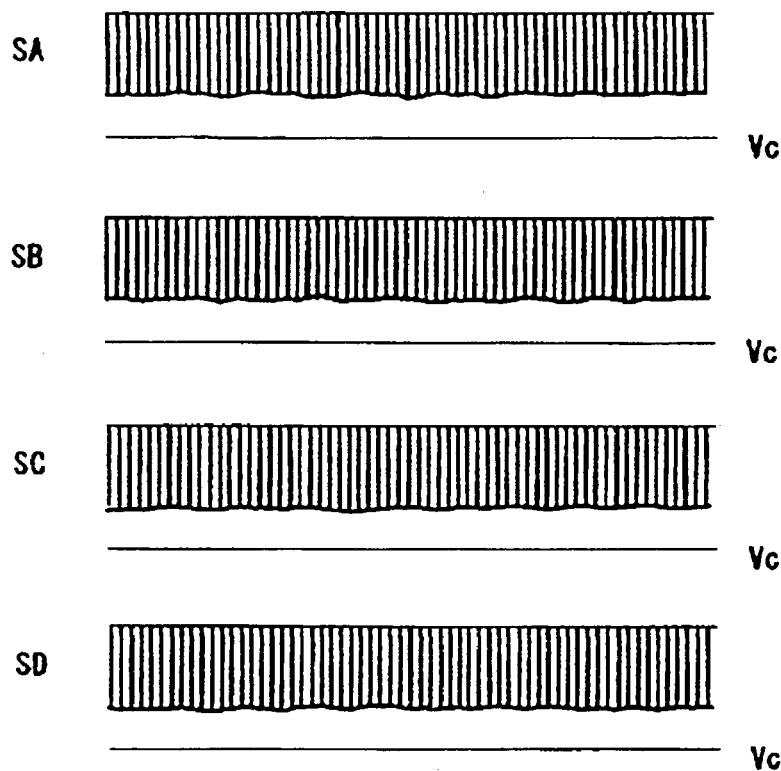
FIG. 13 represents waveforms showing the waveforms of the electric signals obtained from the respective light receiving areas of the photo-detector in FIG. 12 schematically.
Figure 14:
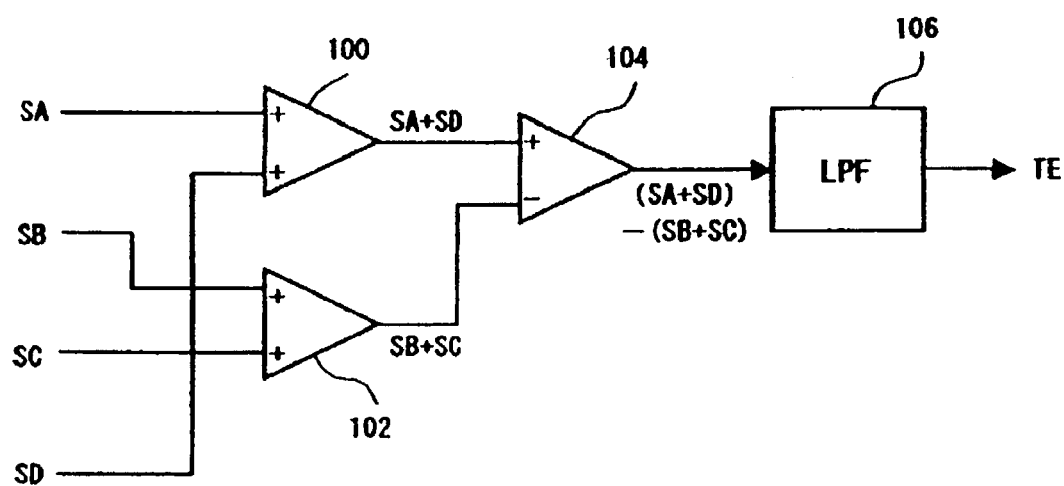
FIG. 14 represents a block diagram showing an example configuration of a conventional tracking error detection circuit.
Figure 15:
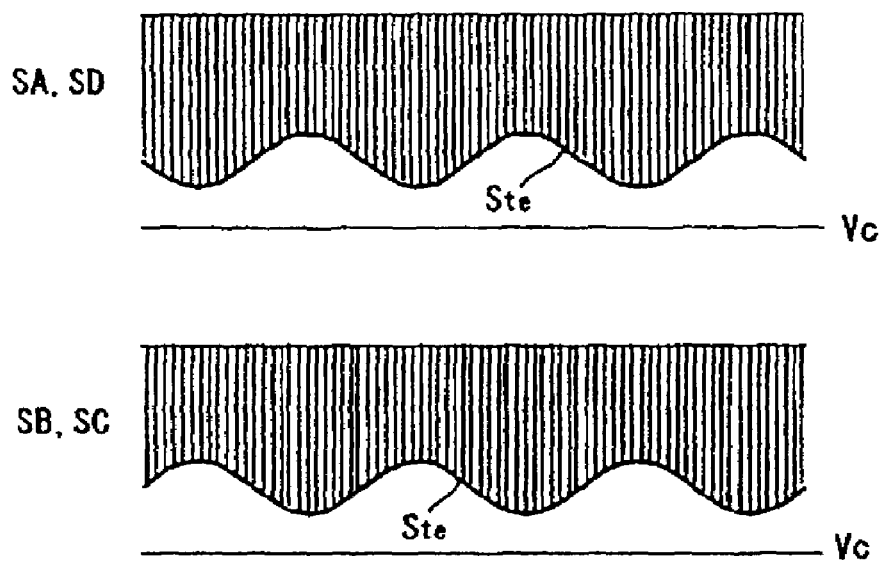
FIG. 15 represents waveforms showing the waveforms of electric signals obtained from the respective light receiving areas of the photo-detector in FIG. 12 during a track jump schematically.
Figure 16:
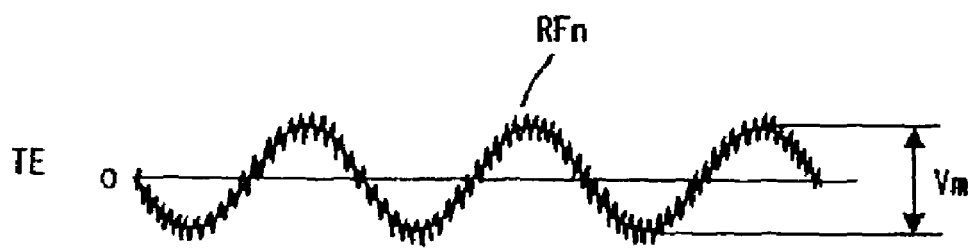
FIG. 16 represents a waveform showing the problem of the tracking error detection circuit in FIG. 14.
Figure 17:
FIG. 17 represents a waveform showing the problem of the tracking error detection circuit in FIG. 14.

Configuration of the tracking error detector in an embodiment of the present invention is shown in FIG. 1. Said tracking error detector is configured as a push-pull system utilizing a quadrant type photo-detector of the type shown in FIG. 12, and has 4 gain control amplifiers 20, 22, 24, and 26, 4 bottom envelope circuits 28, 30, 32, and 34, a pair of subtracting circuits 36 and 38, adding (subtracting) circuit 40, offset circuit 42, and gain control circuit (usually, gain control amplifier) 44.

Gain control amplifiers 20, 22, 24, and 26 take RF signals SA, SB, SC, and SD output from light receiving areas A, B, C, and D of the photo-detector (FIG. 12) as inputs and amplify them according to desired gains while using the same reference voltage $V_c$ as that given to optical pickup 14 as a reference level. An error in amplitude due to the type of a given disk can be absorbed to set the reference level for the RF signals to a prescribed value through said gain control of the former stage.

Bottom envelope circuits 28, 30, 32, and 34 are formed with a capacitor-type peak-hold circuit, for example, whereby bottom envelopes of RF signals SA, SB, SC, and SD are detected, and bottom envelope signals SAbtm, SBbtm, SCbtm, and SDbtm representing the waveforms of the respective bottom envelopes are output. The droop rate (Droop rate) of each peak-hold circuit is set to an appropriate value, so that it can follow the bottom envelope waveform of each RF signal, particularly, tracking modulation elements (modulation frequency and amplitude, in particular) during a track jump, sufficiently.

Here, operations of bottom envelope circuits 28, 30, 32, and 34 are shown schematically in FIG. 2. As described above, sine-wave-like tracking modulation elements SAte, SBte, SCte, and SDte appear at the bottoms of respective RF signals SA, SB, SC, and SD during a track jump. Respective bottom envelope circuits 28, 30, 32, and 34 separate them from respective RF signals and convert them into bottom envelope signals SAbtm, SBbtm, SCbtm, and SDbtm while maintaining the attributes (frequencies and peak-to-peak values, in particular) of respective tracking modulation elements SAte, SBte, SCte, and SDte.

Therefore, assuming that the frequencies of respective tracking modulation elements SAte, SBte, SCte, and SDte are fg (10 kHz, for example), and peak-to-peak values are Vg (50 mV, for example), the frequencies of respective bottom envelope signals SAbtm, SBbtm, SCbtm, and SDbtm also become fg (10 kHz), and the peak-to-peak values become Vg (50 mV). Respective bottom envelope signals SAbtm, SBbtm, SCbtm, and SDbtm hardly contain any RF signal elements.

In terms of the relationships among these 4 bottom envelope signals SAbtm, SBbtm, SCbtm, and SDbtm, there is a correlation between SAbtm and SDbtm and between SBbtm and SCbtm, and there is an inverse correlation between SAbtm, SDbtm and SBbtm, SCbtm in correspondence with the relationships among original RF signals SA, SB, SC, and SD.

In FIG. 1, one of adding circuits 36 takes bottom envelope signal SAbtm from bottom envelope circuit 28 and bottom envelope signal SDbtm from bottom envelope circuit 34 as inputs and outputs an added signal (SAbtm+SDbtm) representing the sum of the signals obtained through addition. Said added signal (SAbtm+SDbtm) hardly contains any RF signal elements, either. Because bottom envelope signals SAbtm and SDbtm are correlated, the peak-to-peak value of said added signal (SAbtm+SDbtm) is equivalent to the value (2Vg: 100 mV) obtained by adding the peak-to-peak values (Vg) of SAbtm and SDbtm.

The other adding circuit 38 takes bottom envelope signal SBbtm from bottom envelope circuit 30 and bottom envelope signal SCbtm from bottom envelope circuit 32 as inputs and outputs an added signal (SBbtm+SCbtm) representing the sum of the signals obtained through addition. Said added signal (SBbtm+SCbtm) hardly contains any RF signal elements, either. Because bottom envelope signals SBbtm and SCbtm are correlated, the peak-to-peak value of said added signal (SBbtm+SCbtm) is equivalent to the value (2Vg: 100 mV) obtained by adding the peak-to-peak values (Vg) of SBbtm and SCbtm.

Figure 3:
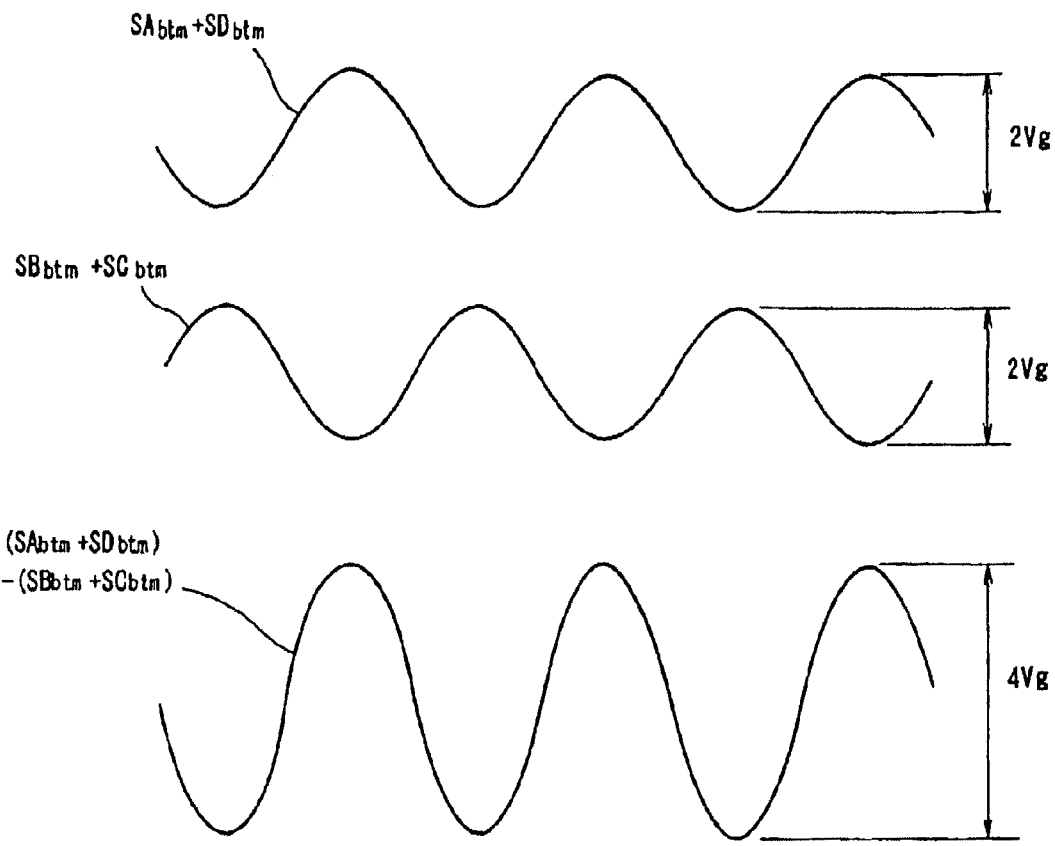
FIG. 3 represents waveforms showing the function of the tracking error detection circuit of the embodiment.

Subtracting circuit 40 takes added signal (SAbtm+SDbtm) from adding circuit 36 and added signal (SBbtm+SCbtm) from adding circuit 38 into its positive terminal and its negative terminal as inputs and outputs difference signal {(SAbtm+SDbtm)−(SBbtm+SCbtm)} representing the difference obtained through subtraction between the signals. The difference signal hardly contains any RF signal elements, either. Because added signal (SAbtm+SDbtm) and (SBbtm+SCbtm) are correlated inversely, as shown in FIG. 3, the peak-to-peak value of said difference signal increases by 2 times (4Vg: 200 mV).

Basically, difference signal {(SAbtm+SDbtm)−(SBbtm+SCbtm)} output from subtracting circuit 40 can be used as a tracking error signal for a push-pull system. In the present embodiment, tracking error signal TE obtained by sending said difference signal through offset circuit 42 and then through gain control circuit 44 to compensate the offset of the tracking error and increase the gain appropriately is output and supplied to an AD converter (not illustrated) of the latter stage. For example, when the input range of said AD converter is 2 V, the amplitude of tracking error signal TE may be amplified to 1.5 V or so at gain control circuit 44. Because tracking error signal TE hardly contains any RF signal elements, resulting in a high SN ratio, its clean waveform can be maintained even after it is amplified. As a result, a highly accurate digital tracking error signal can be obtained.

Figure 4:
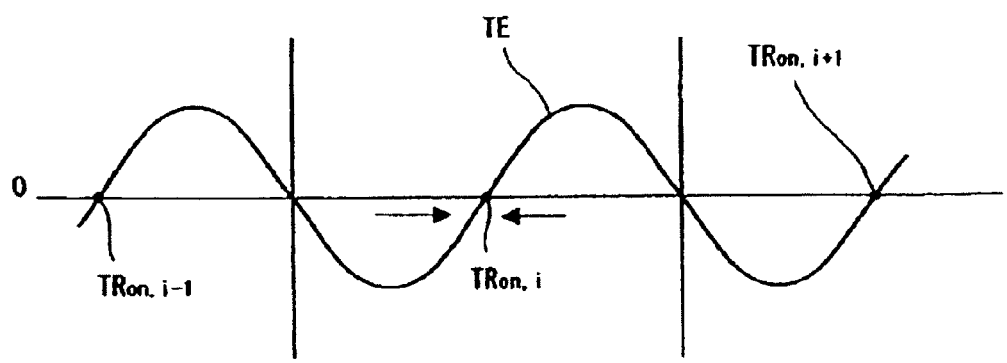
FIG. 4 represents a waveform showing the tracking servo method of the embodiment.

As shown in FIG. 4, during a track jump, the tracking servo is applied using tracking error signal TE as a feedback signal after a 180° segment before and after a desired on-track position TRon, i is reached. In said embodiment, because tracking error signal TE is highly accurate, on-track to the target track can be achieved quickly and accurately.

Although the embodiment involved a quadrant type photo-detector (FIG. 12), the same functional effect can be achieved when a dyadic type or a sextant type photo-detector is utilized simply by changing the quantities of the bottom envelope circuits and the adding circuits in the tracking error generating circuit of the present invention. In addition, the present invention is not limited to the push-pull system, and it can be applied also to other methods. For example, when a 3-beam (3-beam) method is to be used, a photo-detector of the type shown in FIG. 5 can be used to configure the tracking error signal generating circuit of the present invention in the manner shown in FIG. 6.

Figure 5:
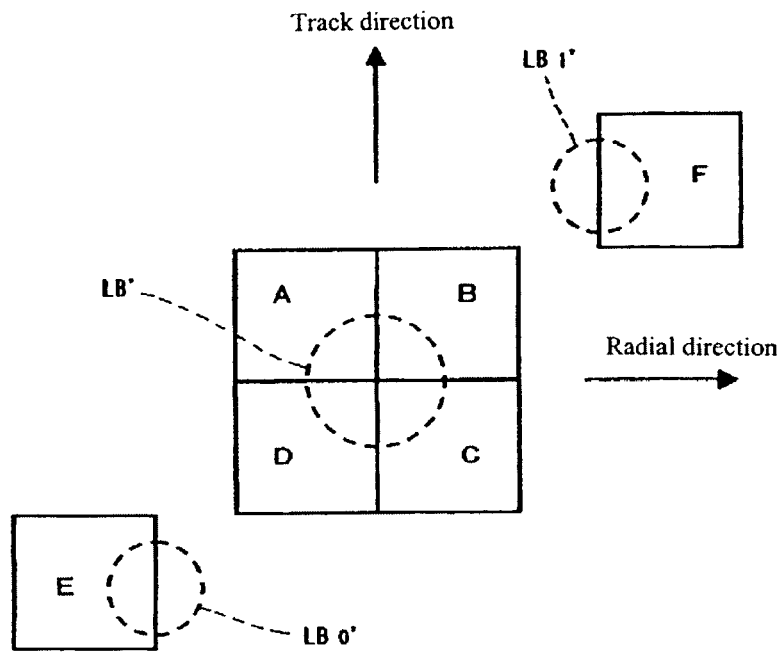
FIG. 5 represents an outlined plan diagram showing the configuration of the photo-detector of the embodiment.

In FIG. 5, a pair of light receiving areas E and F are provided on the left and the right sides of light receiving areas (A, B, C, and D) at a prescribed distance. In the case of the 3-beam method, a pair of sub-beams LB0 and LB1 are focused and irradiated from optical pickup 14 onto signal recording plane 10a of optical disk 10 at a fixed distance in the radial direction across main beam LB, returned or reflected light LB' corresponding to main beam LB is focused and irradiated to light receiving areas (A, B, C, and D) at the center part, and returned or reflected lights LB0' and LB1' corresponding to sub-beams LB0 and LB1 are focused and irradiated to light receiving areas E and F on either side, respectively. Light receiving areas E and F generate RF signals SE and SF according to the quantities and the intensities of the respective lights received.

During an on-track, that is, when the main beam is directly above a track, reflected sub-beams LB0' and LB1' are incident to light receiving areas E and F at the same light intensity, so that the levels of RF signals SE and SF are the same. However, once deviated from the center of the track in the radial direction, the positions on light receiving areas E and F where reflected sub-beams LB0' and LB1' are focused deviate to the left or the right according to the direction and the amount of the deviation, and a level difference corresponding to the tracking error appears between RF signals SE and SF.

Figure 6:
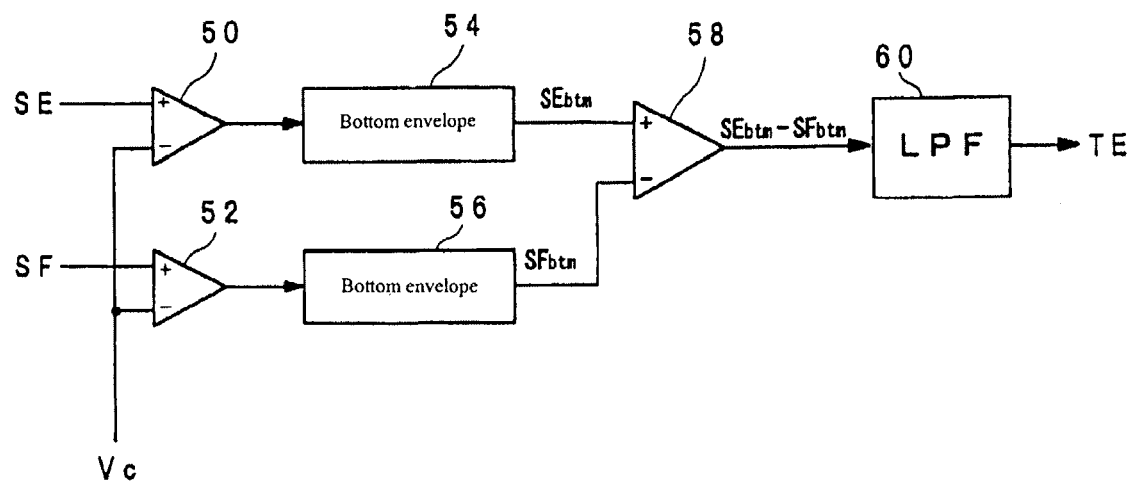
FIG. 6 represents a block diagram showing an example configuration of the tracking error detection circuit of an embodiment.

In FIG. 6, said tracking error detection circuit has 2 gain control amplifiers 50 and 52, 2 bottom envelope circuits 54 and 56, adding (subtracting) circuit 58, and low-pass filter (LPF) 60.

Gain control amplifiers 50 and 52 take RF signals SE and SF output from light receiving areas E and F of the photo-detector (FIG. 5) as inputs and amplify them according to desired gains while using the same reference voltage Vc as that given to optical pickup 14 as a reference level.

Bottom envelope circuits 54 and 56 are configured with a capacitor-type peak-hold circuit, for example, whereby bottom envelopes of RF signals SE and SF are detected, and bottom envelope signals SEbtm and SFbtm representing the respective bottom envelope waveforms are output. The droop rates of the respective peak-hold circuits are set to appropriate values, so that they can follow the bottom envelope waveforms of respective RF signals SE and SF, particularly tracking modulation elements during a track jump, sufficiently.

Although it is omitted from the figure, the same sine-wave-like tracking modulation elements SEte and SFte as those described above appear alternately as inverse phases at the bottoms of RF signals SE and SF during a track jump. Bottom envelope circuits 54 and 56 remove said tracking modulation elements SEte and SFte entirely when generating bottom envelope signals SEbtm and SFbtm. These bottom envelope signals SEbtm and SFbtm hardly contain any RF signal elements.

Subtracting circuit 58 takes bottom envelope signals SEbtm and SFbtm from bottom envelope circuits 54 and 56 as inputs and outputs a difference signal (SEbtm−SFbtm) representing the difference between the signals obtained through subtraction. The difference signal hardly contains any RF signal elements, either. Because bottom envelope signals SEbtm and SFbtm are correlated inversely, the peak-to-peak value of said difference signal doubles.

In the present embodiment, the result from putting said difference signal (SEbtm−SFbtm) through low-pass filter 60 serving as an anti-aliasing filter to cut high-frequency noises (impulse noise, for example) is output as tracking error signal TE and supplied to an AD converter (not illustrated) of the latter stage. Needless to say, like the tracking error signal generating circuit in FIG. 1, offset circuit 42 and gain control circuit 44, for example, may also be inserted. In contrast, anti-aliasing filter 60 may be inserted into the tracking error signal generating circuit in FIG. 1.

Figure 7:
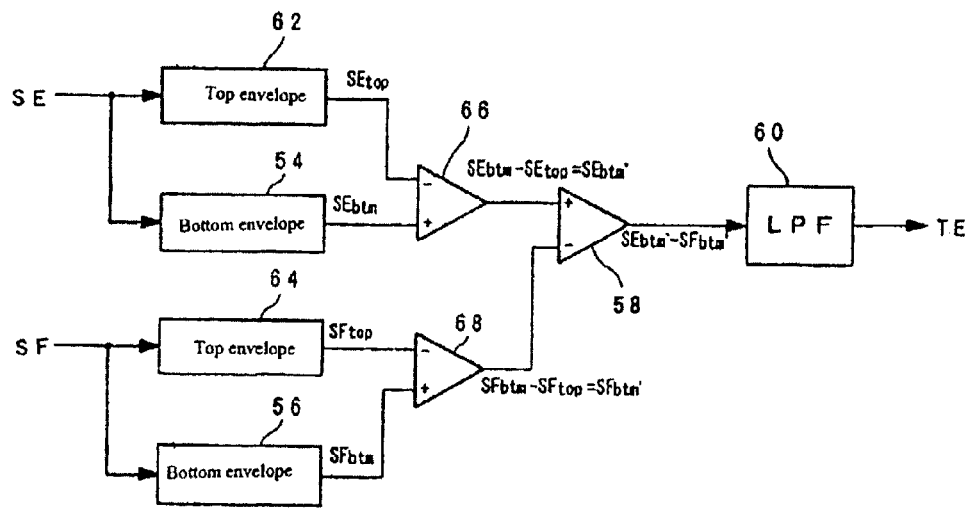
FIG. 7 represents a block diagram showing an example configuration of the tracking error detection circuit of an embodiment.

The configuration of a tracking error signal generating circuit in accordance with another embodiment is shown in FIG. 7. The present embodiment is a modification of the tracking error signal generating circuit in FIG. 6, wherein common parts or constituents are assigned with the same symbols. In the present embodiment, top envelope circuits 62 and 64 and subtracting circuits 66 and 68 are added for RF signals SE and SF, respectively.

Envelope circuits 62 and 64 are configured with a capacitor-type peak-hold circuit, whereby top envelopes of RF signals SE and SF are detected, and top envelope signals SEtop and SFtop representing the respective top envelope waveforms are output. These top envelope signals SEtop and SFtop hardly contain any RF signal elements, either.

Figure 8:
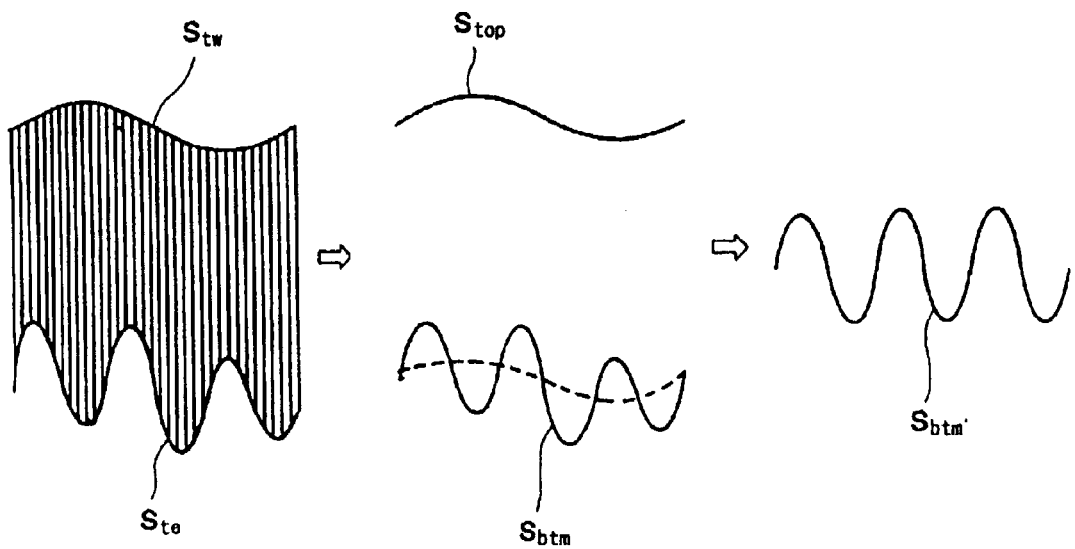
FIG. 8 represents block diagrams showing the function of the tracking error detection circuit in FIG. 7.
Figure 11:
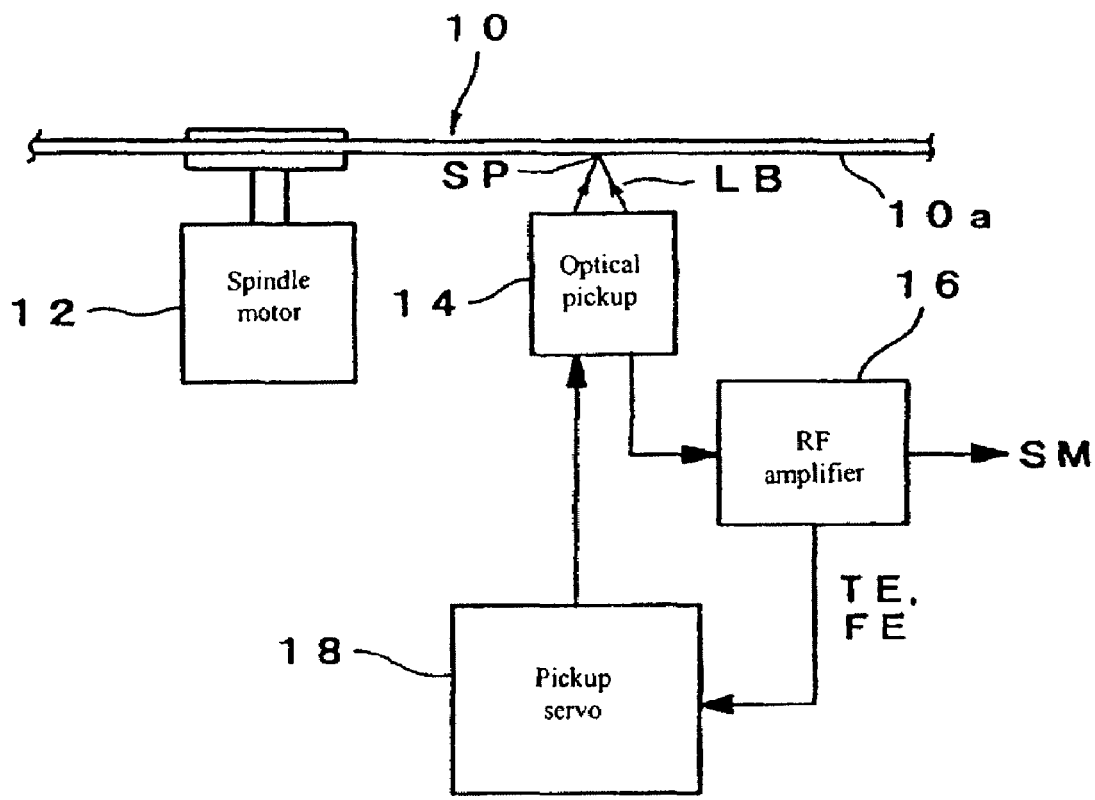
FIG. 11 represents an oblique perspective view showing an example configuration of an optical disk device to which the present invention can be applied.

Usually, when disk 10 is skewed, or when the optical axis of the object lens in optical pickup 14 is deviated, as shown in FIG. 8, the top level of an RF signal obtained from the photo-detector changes like a wave. The droop rates of the peak-hold circuits of top envelope circuits 62 and 64 may be set to such values that they can follow such vibrations SEtw and SFtw of the top levels of RF signals SE and SF.

As shown in FIG. 8, when the top levels of the RF signals vibrate, said vibration elements spread also to the bottom levels, and offsets corresponding to the vibrations of the top levels appear also in tracking modulation elements Ste at the bottom side.

In the present embodiment, bottom envelope signals SEbtm and SFbtm of RF signals SE and SF obtained from bottom envelope circuits 54 and 56 and top envelope signals SEtop and SFtop obtained from top envelope circuits 62 and 64 are input to subtracting circuits 66 and 68. Subtracting circuits 66 and 68 subtract top envelope signals SEtop and SFtop from respective bottom envelope signals SEbtm and SFbtm and output difference signals (SEbtm−SEtop) and (SFbtm−SFtop) as corrected bottom envelope signals SEbtm' and SFbtm'. Not only do these corrected bottom envelope signals SEbtm' and SFbtm' contain no RF signal elements, but the effect of the top levels (offset) is also removed. Furthermore, factor multipliers (not illustrated) may be provided in the latter stage to top envelope circuits 62 and 64 in order to give the results of the multiplication of top envelope signals SEtop and SFtop by appropriate factors to the negative terminals of subtracting circuits 66 and 68.

Corrected bottom envelope signals SEbtm' and SFbtm' output from subtracting circuits 66 and 68 are supplied to subtracting circuit 58, and the difference between signals SEbtm' and SFbtm' is obtained at subtracting circuit 58 in order to obtain difference signal (SEbtm'−SFbtm') having a doubled peak-to-peak value. The result from putting the difference signal through low-pass filter 60 is output as tracking error signal TE. When tracking error signal TE is used as a tracking servo feedback signal, the skewing and the positional deviation of the optical system can be compensated, so that accurate tracking control can be achieved.

Furthermore, the method in which the bottom envelope signals of the respective RF signals are corrected using the top envelope signals can be applied also to the tracking error detection circuit in FIG. 1. In other words, in FIG. 1, top envelope circuits should be provided in parallel with respective bottom envelope circuits 28, 30, 32, and 34, and subtracting circuits are added to subtract the outputs (top envelope signals) of the top envelope circuits from the outputs (bottom envelope signals) of respective bottom envelope circuits.

As described above, in the present invention, because the bottom envelopes are removed first from the electric signals or the RF signals output from the optical pickup, and the necessary arithmetic processing is applied to the removed bottom envelopes, the RF signal elements can be cut sufficiently, so that a highly precise tracking error signal with an excellent SN characteristic can be obtained. In addition, because the tracking modulation elements necessary for the tracking servo which appear at the bottoms of the RF signals can be converted into low-frequency signals without dropping their levels, a wide-band circuit is not needed.

In other words, the present invention is characteristic in that the bottom envelope elements, or the top envelope elements and the bottom envelope elements, of the RF signals obtained from the optical pickup or the light receiving element can be extracted accurately during tracking error detection using a 3-beam method or a push-pull system in order to obtain the necessary information for tracking error detection from said envelope elements.

Here, differences between the method of the present invention in which the bottom envelopes are removed from the RF signals first and the conventional method in which the RF signals are simply put through the low-pass filter will be explained using actual waveform models from the viewpoint of frequency spectra in accordance with Fourier transformation.

First, a model in which low-frequency modulation element MOD (t) (envelope element) is simply superimposed on RF signal RF(t) having a fixed amplitude as shown in FIG. 9(A) will be considered. Signal f (t) in said model is expressed by Equation (1) given below.

$$f(t) = RF(t) + MOD(t) \qquad (1)$$
$$= A_{RF}\cos\omega_{RF}t + A_{MOD}\cos\omega_{MOD}t$$

Here, $A_{RF}$ and $\omega_{RF}$ represent the amplitude and the frequency of RF signal RF(t), and $A_{MOD}$ and $\omega_{MOD}$ represent the amplitude and the frequency of low-frequency modulation element MOD (t). Equation (1) becomes Equation (2) given below when Fourier transformation is applied. Furthermore, the integration segment of each integration symbol $\int$ is from $-\infty$ to $+\infty$.

$$H(j\omega) = \int f(t)e^{-j\omega t}dt \qquad (2)$$
$$= \int A_{RF}(e^{j\omega_{RF}t} + e^{-j\omega_{RF}t})/2 \cdot e^{-j\omega t}dt +$$

-continued $$\int A_{MOD}(e^{j\omega MOD t} + e^{-j\omega MOD t})/2 \cdot e^{-j\omega t} dt$$

$$= A_{RF}/2 \cdot \int e^{-j(\omega - \omega_{RF})t} dt + A_{RF}/2 \cdot \int e^{-j(\omega + \omega_{RF})t} dt +$$

$$A_{MOD}/2 \cdot \int e^{-j(\omega - \omega_{MOD})t} dt + A_{MOD}/2 \cdot \int e^{-j(\omega + \omega_{MOD})t} dt$$

$$= \pi A_{RF} \delta(\omega - \omega_{RF}) + \pi A_{RF} \delta(\omega + \omega_{RF}) +$$

$$\pi A_{MOD} \delta(\omega - \omega_{MOD}) + \pi A_{MOD} \delta(\omega + \omega_{MOD})$$

The spectra of model signal f(t) obtained by the Fourier transformation are shown in FIG. 9(B).

Next, a model in which low-frequency modulation element MOD (t) is superimposed only on the bottom side of RF signal RF(t) having a fixed amplitude as shown in FIG. 10(A) will be considered. Signal f(t) in said model is expressed by Equation (3) given below.

$$f(t) = RF(t) \times (1 - MOD(t)) + A_{RF} MOD(t) \qquad (3)$$

$$= A_{RF} \cos\omega_{RF} t \times (1 - A_{MOD} \cos\omega_{MOD} t) +$$

$$A_{RF} \times A_{MOD} \cos\omega_{MOD} t$$

In this Equation (3), too, $A_{RF}$ and $\omega_{RF}$ represent the amplitude and the frequency of RF signal RF(t), and $A_{MOD}$ and $\omega_{MOD}$ represent the amplitude and the frequency of low-frequency modulation element MOD (t). When Fourier transformation is applied, Equation (3) becomes Equation (4) given below. Here, the integration segment of each integration symbol ∫ is from −∞ to +∞ also.

$$H(j\omega) = \int A_{RF}(e^{j\omega RF t} + e^{-j\omega RF t})/2 \cdot e^{-j\omega t} dt - \qquad (4)$$

$$\int A_{RF}(e^{j\omega RF t} + e^{-j\omega RF t})/2 \cdot A_{MOD}(e^{j\omega MOD t} + e^{-j\omega MOD t})/2 \cdot e^{-j\omega t} dt +$$

$$\int A_{RF} A_{MOD}(e^{j\omega MOD t} + e^{-j\omega MOD t})/2 \cdot e^{-j\omega t} dt$$

$$= A_{RF}/2 \cdot \int e^{-j(\omega - \omega_{RF})t} dt + A_{RF}/2 \cdot \int e^{-j(\omega + \omega_{RF})t} dt -$$

$$A_{RF}/2 \cdot A_{MOD}/2 \cdot \int e^{-j(\omega - \omega_{RF} - \omega_{MOD})t} dt +$$

$$\int e^{-j(\omega - \omega_{RF} + \omega_{MOD})t} +$$

$$\int A_{RF} A_{MOD}/2 \cdot \int e^{-j(\omega - \omega_{MOD})t} dt +$$

$$\int A_{RF} A_{MOD}/2 \cdot \int e^{-j(\omega + \omega_{MOD})t} dt$$

$$= \pi A_{RF} \delta(\omega - \omega_{RF}) + \pi A_{RF} \delta(\omega + \omega_{RF}) -$$

$$1/2 \cdot \{\pi A_{RF} A_{MOD} \delta(\omega - \omega_{RF} - \omega_{MOD}) + \pi A_{RF} A_{MOD} \delta(\omega + \omega_{RF} + \omega_{MOD}) +$$

$$\pi A_{RF} A_{MOD} \delta(\omega + \omega_{RF} - \omega_{MOD}) + \pi A_{RF} A_{MOD} \delta(\omega + \omega_{RF} + \omega_{MOD})\} +$$

$$\pi A_{RF} A_{MOD} \delta(\omega - \omega_{MOD}) + \pi A_{RF} A_{MOD} \delta(\omega + \omega_{MOD})$$

Spectra of model signal f(t) obtained by the Fourier transformation are shown in FIG. 10(B).

When specific numerical values ($A_{RF}=\frac{1}{2}$, $A_{MOD}=0.4/2$) are inserted into the equation, and respective factors are compared, the following emerges.

$$f(t) = RF(t) \times (1 - MOD(t)) + A_{RF} MOD(t) \qquad (5)$$

$$= 1/2 \cdot \cos\omega_{RF} t \times (1 - 1/2 \cdot \cos\omega_{MOD} t) +$$

$$1/2 \cdot 0.4/2 \cdot$$

$$= 0.5\cos\omega_{RF} t (1 - 0.2\cos\omega_{MOD} t + 0.1\cos\omega_{MOD} t$$

$$H(j\omega) = 0.5\pi\delta(\omega - \omega_{RF}) + 0.5\pi\delta(\omega + \omega_{RF}) -$$

$$\{0.05\pi\delta(\omega - \omega_{RF} - \omega_{MOD}) + 0.05\pi\delta(\omega + \omega_{RF} + \omega_{MOD}) +$$

$$0.05\pi\delta(\omega + \omega_{RF} - \omega_{MOD}) + 0.05\pi\delta(\omega + \omega_{RF} + \omega_{MOD})\} +$$

$$0.1\pi\delta(\omega - \omega_{MOD}) + 0.1\pi\delta(\omega + \omega_{MOD})$$

On the other hand, when Fourier transformation is applied to 0.4/2 cos ωt (bottom envelope element in FIG. 10(A)) as is, the following emerges.

$$H(j\omega) = 0.2\pi\delta(\omega - \omega_{MOD}) + 0.2\pi\delta(\omega + \omega_{MOD}) \qquad (6)$$

It is clear from 5 and 6 that the amplitudes of $\omega_{MOD}$ spectra of the conventional method and the present method are 0.1 versus 0.2, that is, at a 1:2 relationship.

The present invention can be applied to an arbitrary tracking control method for an optical disk device. In addition, the element techniques used in the present invention can be modified in a variety of ways. In particular, the photo-detection means, the envelope detection means, and the operation means of respective types are not limited to those in the embodiments, and methods or configurations of other types can also be utilized.

As explained above, with the tracking error detector of the present invention, high-frequency elements can be cut sufficiently, and a highly precise tracking error signal with an excellent SN ratio and which can be digitized easily can be obtained.

The invention claimed is:

1. A tracking error detector being a tracking error detector for detecting a positional error in the radial direction perpendicular to the track direction of a beam spot on a recording plane of an optical disk as a tracking error, comprising:
   a photo-detection circuit which receives a beam of light reflected by the signal recording plane of the optical disk using a first and a second set of light receiving areas provided in inverse phases and outputs multiple electric signals according to the light intensities of the light beam reflected at the light receiving areas of the respective sets,
   bottom envelope detection circuit which detect bottom envelopes of the multiple electric signals and generate multiple bottom envelope signals representing the waveforms of the respective bottom envelopes,
   a first adding circuit which takes the sum of the multiple bottom envelope signals obtained from the first set of light receiving areas in order to generate a first added signal,
   a first adding circuit which takes the sum of the multiple bottom envelope signals obtained from the second set of light receiving areas in order to generate a second added signal, and
   a tracking error generating circuit which takes the difference between the first added signal and the second added signal in order to generate a tracking error signal representing the tracking error.

2. The tracking error detector described as in claim 1, wherein the tracking error detector comprises a top envelope detection circuit which detect top envelopes of the respective electric signals in order to generate top envelope signals representing the waveforms of said top envelopes, and
   a correction circuit which subtracts the top envelope signals from the corresponding bottom envelope signals in order to correct the bottom envelope signals.

3. The tracking error detector as in claim 1, wherein one of the reflected light beams obtained from 1 beam spot position on the signal recording plane of the optical disk is incident onto the first or the first set of light receiving areas and the second or the second set of light receiving areas at a light intensity rate in accordance with the tracking error.

4. The tracking error detector as in claim 1, wherein a pair of reflected light beams obtained from a pair of positions determined near the recording plane of the optical disk in the radial direction at a fixed distance is incident onto the first or the first set of light receiving areas and the second or the second set of light receiving areas individually at a light intensity rate in accordance with the tracking error.

* * * * *